US007640318B1

(12) United States Patent
Hull et al.

(10) Patent No.: US 7,640,318 B1
(45) Date of Patent: Dec. 29, 2009

(54) METHOD AND APPARATUS FOR PUBLISHING DOCUMENTS OVER A NETWORK

(75) Inventors: Jonathan J. Hull, San Carlos, CA (US); Marko Balabanovic, San Francisco, CA (US); Peter Hart, Menlo Park, CA (US); Greg Wolff, Mountain View, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/398,229

(22) Filed: Sep. 17, 1999

(51) Int. Cl.
*G06F 15/16* (2006.01)

(52) U.S. Cl. ....................... 709/217; 709/203; 709/225; 709/229; 707/200; 707/204; 707/E17.006

(58) Field of Classification Search ................. 709/204, 709/217, 218, 219, 206, 207, 203, 225, 229; 707/10, 200, 204, E17.006; 708/200, 204
See application file for complete search history.

(56) References Cited

U.S. PATENT DOCUMENTS 5,692,048 A * 11/1997 Gormish et al. ............. 380/246
5,710,883 A 1/1998 Hong et al.
5,848,413 A * 12/1998 Wolff .......................... 707/10
5,870,552 A * 2/1999 Dozier et al. ............... 709/219
5,911,776 A * 6/1999 Guck ......................... 709/217
5,953,525 A * 9/1999 Glaser et al. ................ 717/105
5,956,036 A * 9/1999 Glaser et al. ................ 715/853
5,978,477 A * 11/1999 Hull et al. ................... 358/403
5,987,510 A * 11/1999 Imai et al. ................... 709/219
5,999,942 A * 12/1999 Talati ....................... 707/104.1
6,044,372 A * 3/2000 Rothfus et al. ................ 707/10
6,128,655 A * 10/2000 Fields et al. ................ 709/219
6,188,673 B1 * 2/2001 Bauer et al. ................. 370/252
6,199,073 B1 * 3/2001 Peairs et al. ................ 707/204
6,209,048 B1 * 3/2001 Wolff .......................... 710/62
6,259,701 B1 * 7/2001 Shur et al. .................. 370/401
6,314,420 B1 * 11/2001 Lang et al. ...................... 707/3
6,317,777 B1 * 11/2001 Skarbo et al. ............... 709/204
6,324,538 B1 * 11/2001 Wesinger et al. .............. 707/10
6,363,469 B1 * 3/2002 Okamoto et al. ............ 711/220
6,449,639 B1 * 9/2002 Blumberg ................... 709/217
6,460,036 B1 * 10/2002 Herz ........................... 707/10

(Continued)

FOREIGN PATENT DOCUMENTS

JP 08-163160 6/1996

(Continued)

OTHER PUBLICATIONS

Japanese Office Action for JP Appln. No. 2000-276232, (2 pages).

*Primary Examiner*—Alina N. Boutah
(74) *Attorney, Agent, or Firm*—Blakely, Sokoloff, Taylor & Zafman LLP

(57) ABSTRACT

An apparatus and method for publishing an electronic document on a network is described. In one embodiment, an apparatus for publishing an electronic document on a wide area network comprising at least one server and a client, a client having memory for storing an electronic document, and means for sending the electronic document to the server, wherein a URL is associated with the electronic document, a security key associated with the URL, and means for sending a URL to a user.

17 Claims, 4 Drawing Sheets

U.S. PATENT DOCUMENTS 6,484,198 B1 * 11/2002 Milovanovic et al. ....... 709/218
6,546,385 B1 * 4/2003 Mao et al. ...................... 707/3
6,584,508 B1 * 6/2003 Epstein et al. .............. 709/229
6,633,855 B1 * 10/2003 Auvenshine ................. 706/15
6,671,706 B1 * 12/2003 Vinh .......................... 707/204
6,684,239 B1 * 1/2004 Flepp et al. ................. 709/206
6,742,116 B1 * 5/2004 Matsui et al. ............... 713/171
6,763,496 B1 * 7/2004 Hennings et al. ............ 715/205
7,039,856 B2 * 5/2006 Peairs et al. ................ 715/500
2001/0016852 A1 * 8/2001 Peairs et al. ................ 707/204
2001/0043362 A1 * 11/2001 Hull et al. .................. 358/1.15
2002/0091725 A1 * 7/2002 Skok ....................... 707/501.1

FOREIGN PATENT DOCUMENTS

JP 11-015818 1/1999
JP 11-031129 2/1999
JP 11-085690 3/1999

* cited by examiner

METHOD AND APPARATUS FOR PUBLISHING DOCUMENTS OVER A NETWORK

BACKGROUND OF THE INVENTION

1. Field of the Invention

The invention relates to publishing electronic documents over a network, such as a wide area network, the World Wide Web, etc.; more specifically, the invention relates to controlling access to documents accessible over a network.

2. Description of Related Art

Publishing electronic documents on a network such as a wide area network is known in the art. For example, see U.S. Pat. No. 5,870,552 issued to Dozier. These systems are usually client-server systems in which clients make requests to the server, and the server generates responses. Client-server platforms are used for authoring of documents, content-based indexing of documents, retrieval of documents, management and control of documents, and support for developing form-driven interactive services.

In typical client-server document systems, a document is stored on a server from which a user accesses, edits, and/or restores the document. While providing users with an opportunity to perform various tasks on a document stored on a server, such systems and the access to documents thereon lack important security measures. For example, a document stored on a server without some security mechanism (e.g., a security key) does not prevent unscrupulous users from accessing the document. Moreover, because documents may reside on a server for an indefinite period of time, there is an increased risk that an unauthorized user may gain access to a document. Currently, there is no system that ensures that only authorized users gain access to a document published on a network and that prevents documents from being maintained for long periods of time on a server. It is, therefore, desirable to have a system that uses security measures to prevent unauthorized individuals from gaining access to documents residing on a server and that reduces the risk of unauthorized access.

SUMMARY OF THE INVENTION

A system for publishing an electronic document on a network is described. In one embodiment, the system comprises a document source, a filter, and a server. The document source supplies an electronic document. The document source may be a multifunction machine. The filter transforms the electronic document for publication. The server has a memory for storing the electronic document and permits access to the electronic document using a document identifier. The server also sends, to a publisher designated location, information regarding accesses to the electronic document.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION OF THE INVENTION

Figure 1:
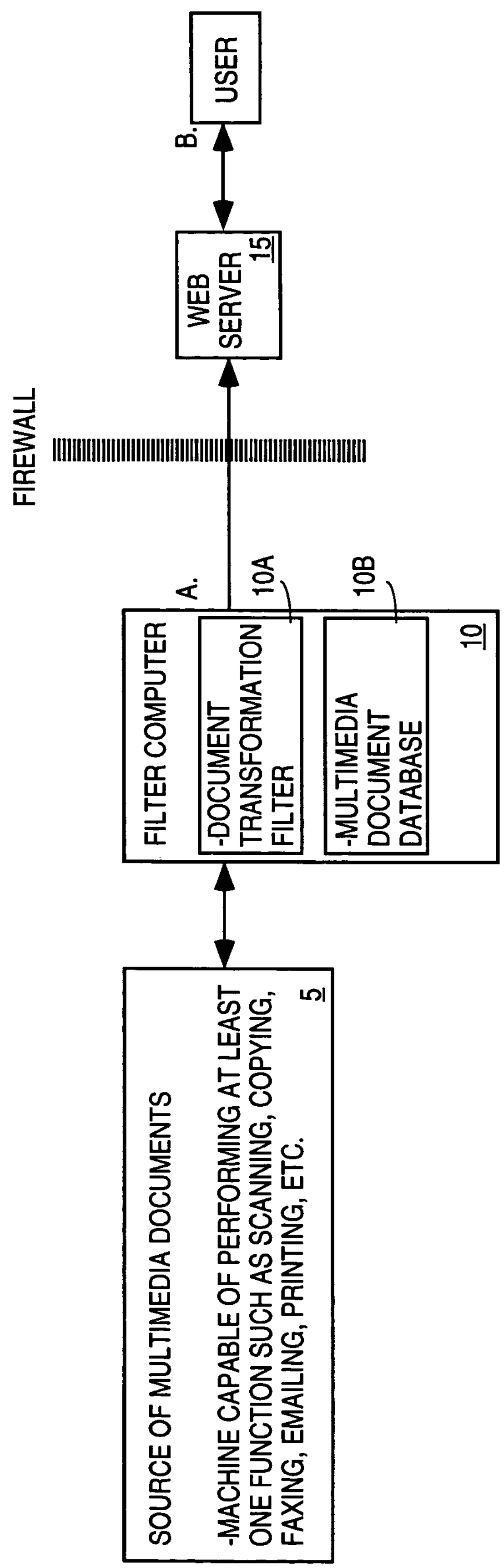
FIG. 1 is a block diagram of one embodiment of a document publishing system.

In the following description, numerous specific details are set forth to provide a thorough understanding of the invention. However, it will be understood by one of ordinary skill in the art that the invention may be practiced without these specific details. In other instances, well known structures and techniques have not been shown in detail in order not to obscure the invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

OVERVIEW

A publishing system is described that has a source of documents, a filter to filter the documents so that only selected documents are published, and a web server to allow access to selected documents. In one embodiment, the filter transforms the appearance of the document and notifies others that publication has taken place, e.g., by email. In one embodiment, the filter comprises a computer that stores and sends an electronic document to a server to "publish" the documents. The document is accessed using a document identifier (e.g., a URL). A user name and a password or other security key may also be generated to access the electronic document. The URL and any user name and password are sent to an authorized user (viewer), thereby enabling the authorized user to access the document. The user name and password or security key may be encoded in the URL itself. Users can optionally publicize a document by emailing the URL to a World Wide Web indexing service (e.g., Yahoo, Altavista, Excite, or an existing publicity service).

In one embodiment, the server receiving the document automatically deletes it once a predetermined condition has been met. The condition may relate to the number of times a document has been accessed, (e.g., after the document has been accessed once, a certain number of accesses), amount of time (e.g., 10 days) from the date of first access or publication, or after the document has been successfully downloaded by a user from a specified internet address (IP address), etc. The condition may be established by the publisher of the document or a user.

FIG. 1 is a block diagram of one embodiment of a publishing system. The publishing system may comprise a multimedia World Wide Web publishing system where the documents being published are multimedia documents. For example, these documents may include scanned images, sound and/or video clips.

Referring to FIG. 1, document source 5 generates documents. In one embodiment, document source 5 may be capable of performing multiple functions such as, for example, copying, faxing, e-mailing, printing, or scanning an electronic document. The documents may be generated and published as part of performing that function(s). For example, if document source 5 comprises a copier, the document that is generated for potential publication is the result of performing the copying operation. Saving a copy of a document as a side effect of another process (e.g., copying, printing, faxing, etc.) in the absence of an explicit command by a user to do so is referred to herein as "unconscious" capture.

In one embodiment, document source 5 comprises a multifunction machine, workstation, or scanner. Document source 5 may have a specifically designed touchscreen interface that controls the publication process. Options available on the interface may include (1) specifying destination web server; (2) specifying level of security; (3) specifying publicity; (4) specifying email destinations for published URL (document identifier) and password; (5) specifying local output of a document, including printing, faxing, and emailing. Document source 5 may also include facilities for composition of multimedia documents such as audio and video capture devices.

Document source 5 may comprise a printer driver. In such a case, users print to a "webpublish" printer. The document, however, is actually not printed, i.e., paper would not actually be generated, but the postscript or other printer language for the document would be transferred to filter computer 10. Similarly, in one embodiment, users email the document as an attachment to the "webpublish" address.

The generated electronic documents are sent to and received by a filter computer 10. Filter computer 10 comprises a document transformation filter 10A to transform documents into a format suitable for publication. For example, in one embodiment, filter computer 10 may convert Postscript documents into HTML. That is, in one embodiment, software executing on filter computer 10 transforms the documents from document source 5.

In one embodiment, document transformation filter 10A ensures that the document meets certain standards established by a publisher such as the electronic document is free of pornographic or violent material. Additionally, filter computer 10 may prevent documents designated as "confidential" from being published unless conditions specified by the publisher are met. Filter computer 10 may also filter other information that a publisher wishes to prevent from being published outside of a firewall. Thus, filter computer 10 filters a document of elements that a publisher specifically requests not to be placed on server 15, such as, for example, material deemed to be pornographic, violent, or information designated as proprietary by the publisher. Alternatively, a document may be filtered at a work station used to compose the electronic document. Also filter computer 10 may screen for and remove viruses, especially so called "macro" viruses from, for example, Microsoft Word or PowerPoint documents. Techniques for virus removal are well-known in the art.

Filter computer 10 may also have a database 10B for storing and organizing multiple documents. In one embodiment, filter computer 10 is capable of hosting multimedia data used in composing the document. Filter computer 10 may be embedded either in a multi-functional machine or a single function device, such as, for example, a copier, a facsimile, a printer, a scanner, a smaller device, etc.

Filter computer 10 sends the document(s) to server 15, which may be outside a firewall, for publication. In one embodiment, the connection between filter computer 10 and server 15 may be implemented with an Internet network connection. In another embodiment, this connection may be by a dialup bulletin board server.

After the electronic document is stored on server 15, a user using an interface on a client (not shown) is able to gain access to the electronic document. In one embodiment, the user accesses the document with a document identifier (e.g., a URL). In an alternate embodiment, the URL and an associated user name and password, or security key, are required to access the document. After the user inputs the URL and any necessary user name and password, the user is able to access the electronic document. A user may be notified of the document identifier and/or the password using an e-mail system. Server 15 may also enforce different levels of security.

In one embodiment, filter computer 10 returns the URL for the published document to the original publisher, perhaps by email. Optionally, users of the document source 5 could indicate a password for the document on the print command line.

Server 15 may be located on a private network. In an alternate embodiment, server 15 may be a dialup bulletin board server. Server 15 may be structured as a collection of individual documents or it could be set up as a searchable database of documents. In the latter case, users may be provided with their own home pages that are portals to each user's "collection of documents." A publisher will have access to a list of allowable users at the time at which a document is to be published.

A software system manager for server 15 may be included. The software system manager may run in the background as a Windows Service or Unix daemon. The system manager monitors the access logs and updates a database of information about who or what systems access which documents at what times. This information would be made available to publishers so they could monitor when their documents are accessed. Thus, server 15 records the number of times a document is accessed, the time of each document access, and/or who obtained access to a document. Server 15 may also notify a publisher that the document has been accessed and specify who accessed it.

Other common system management functions that may be performed by the system manager would include deleting documents. After the electronic document has been accessed by a user a predetermined number of times (e.g., 1, 2, etc.), the system manager server 15 may automatically delete the document depending upon the instructions provided by the publisher or by a user (depending on the implementation) to server 15. The deletion of the document may be based on a specified condition (e.g., the document is deleted after a certain period of time, after all of the authorized users have accessed the document, etc.). For example, at the time documents are published, users would have the option of setting a deletion date. When that date arrives, the system manager would automatically delete the indicated document. This would support the transient use of published documents.

When a document is published, such as when the document is sent to a user's collection of documents, notification may be automatically sent to that user indicating that a document has been sent to his collection of documents. Automatic notification may be based upon an event designated by the publisher (or user), such as a time period, a condition precedent, a condition concurrent or a condition subsequent. The notification may occur through e-mail by an e-mail based document manager which is part of server 15. The e-mail based manager may have sorting, sending, and receiving capabilities.

In order to receive e-mail notification, users may need a computer executing a program that allows for monitoring and detecting of incoming e-mail. In one embodiment, the software program executing on the user's computer detects receipt of a message notifying the user that he has received e-mail. In one embodiment, the user's computer may execute software that performs an automatic updating process that copies the published document to the user's computer. Such software may be triggered by receipt of the notification message. In one embodiment, the software executing on the computer also sends a command back to web server 15 to remove the published document.

Server 15 may also include an email-based document manager to allow publishers to send an email message to server 15 to obtain a listing of published documents, to add or delete passwords or to delete the document.

Figure 2:
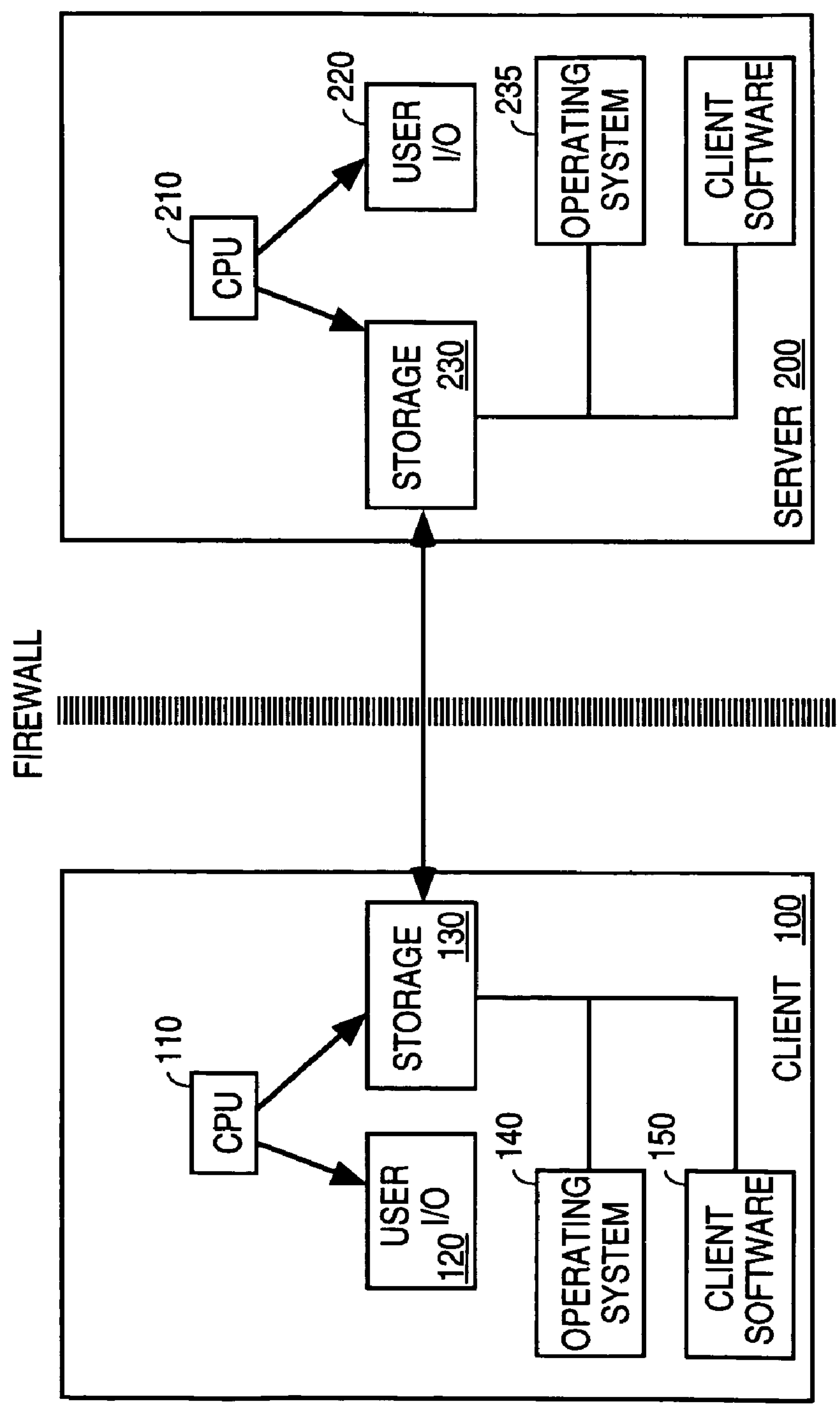
FIG. 2 is a block diagram of one embodiment of a high-level architecture for a typical client-server network.

FIG. 2 shows client 100 and server 200 with a firewall (optional) between client 100 and server 200. Client 100 has a central processing unit 110, a user input-output device or interface 120, at least one storage unit 130, an operating system 140, and client software 150.

Server 200 contains a central processing unit ("CPU") 210, a user input-output 220, a storage unit 230, an operating system 235, and computer programs for execution thereon. In one embodiment, storage 230 maintains documents and access logs. Access logs record information such as the time a document is accessed, the number of times a documents has been accessed, and by whom.

Figure 3:
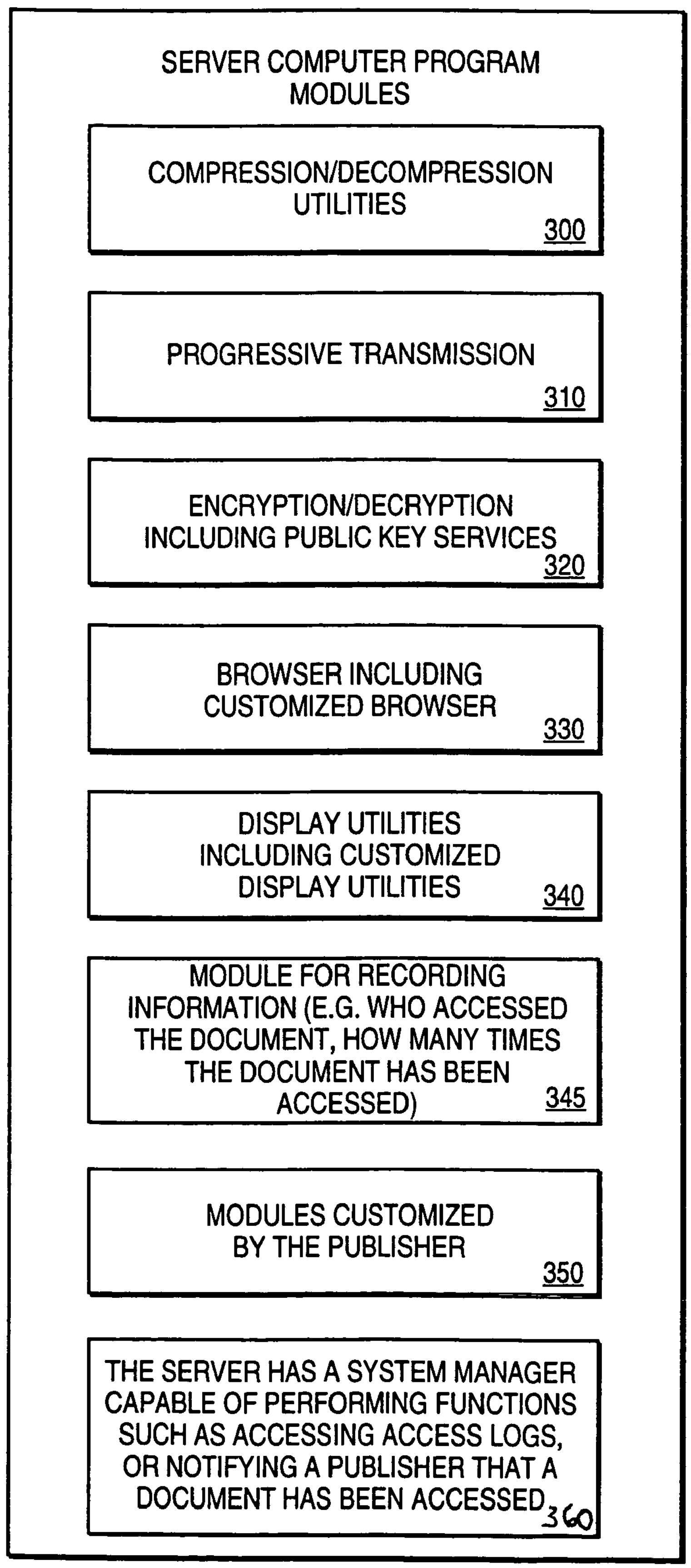
FIG. 3 shows one embodiment of a computer program with various modules that may be executed by one or more processing devices.

The server may include a library of software modules that allow for progressive display of large document images as well as a collection of plug-ins that can be used to display the multimedia data in published documents. FIG. 3 illustrates modules that may be used in a computer program for the server 15 for easy access and use of the documents stored thereon. Compression/decompression module 300 is used for compressing or decompressing a large quantity of document data or multiple documents stored on server 15. Additionally, progressive transmission and display module 310 may be used for displaying a reduced resolution version of a document image while the system loads a higher resolution version of the image (e.g., one page of the document is shown at one time and then the next page is transmitted). Encryption/decryption module 320 adds additional security measures to documents, such as, for example, encrypting or decrypting a document, including public key services. Browser module 330 generates and operates a browser, including a customized browser 330 that may be placed on the server for access by the user.

Moreover, a customized display utilities module 340 allows a user to customize the type of display for certain types of documents on the server. For example, some users may require very complex display utilities based on the type of services required by the user. The user may, for example, be a graphic artist who needs significant color, sound, and sight capabilities in order to construct a complex media document. This module allows that user to set the type of display parameters that he requires. Modules could be customized by the publisher 350 to allow a publisher to provide customized utilities for his users or for the publisher himself. This may include such items as performing complex mathematical calculations in a document. System manager module 360 has modules for performing various functions such as maintaining the access logs in which information is recorded such as how many times a document has been accessed, when a document was accessed, and who accessed the document. Additionally, the server manager module 360 may notify a publisher that a document has been accessed or it may notify the user that an e-mail has been sent and its location on that server.

Figure 4:
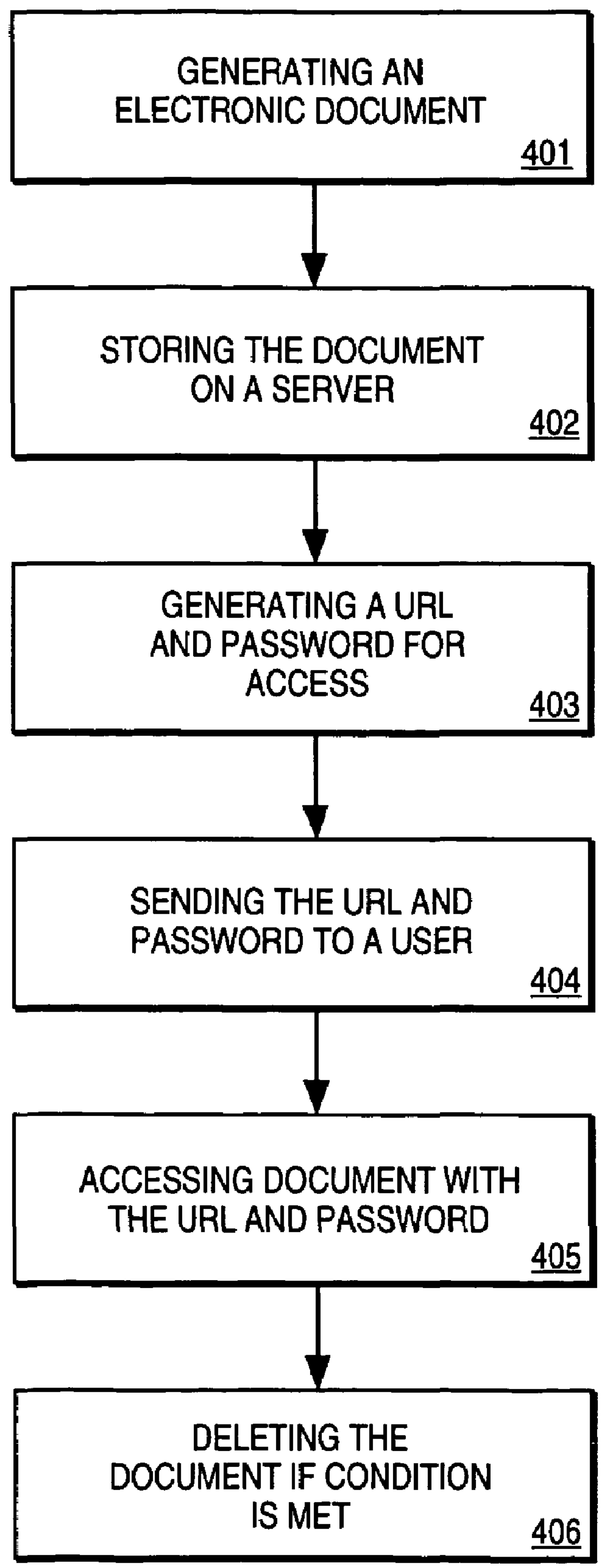
FIG. 4 is a flow chart of one embodiment of a process for providing access to an electronic document.

FIG. 4 is a flow chart of the operation of the publishing system. Referring to FIG. 4, the process begins by generating an electronic document, including transforming a document into an electronic format (e.g., HTML) if necessary (processing block 401). The document is then stored on a server (processing block 402). After storing the document (or at the same time), a URL and a password are generated to enable access to the document (processing block 403). The URL can be generated at the source automatically by, e.g., maintaining a counter that is incremented for each document published at that source. Such a URL might look like http://www.ricoh.com/45.html for the 45th published document. The URL could also be generated manually at the source by allowing the user to enter a name for the document. In addition to the automatic URL generation method discussed above, URLs can be generated automatically on the server by generating a long random number. This has the advantage of providing some level of security. It will be difficult for anyone trying to break into the system to guess such a randomly generated URL.

The password can be generated by the user or publisher at the source. It can also be generated automatically by the source or filter computer. Such generation may be random generation.

In an alternative embodiment, the resource locator (e.g., URL) and password may be generated prior to storing the document on the server.

The URL and password are then forwarded to one or more users (processing block 404). In one embodiment, these are forwarded via email. These may be forwarded separately and may be forwarded using offset communication mechanisms.

The URL and (optionally) the password can be emailed by the publisher user to intended recipients. If done from the console of a multifunction machine, the user interface would include functionality for entering the email addresses or fax phone number of intended recipients. The email or faxing could be performed by the filter computer or the server. In an alternate embodiment, after the document is stored on the server, the URL and password are returned to the source (e.g., multifunction machine). It then performs the email or faxing of the URL. This has the advantage of supporting remote publishing with locally controlled publicity. The server might be a public system in which the publisher user does not want to share his list of recipients. It might be a confidential customer list, for example.

Once the URL and password have been obtained, the user accesses the document (processing block 405). The server tests whether a condition has been met (e.g., all authorized users have accessed the document, etc.) (processing block 406). If so, then the server deletes the document (processing block 407) and the processor ends.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A computer-implemented method comprising:

receiving multiple electronic documents at a server that have been saved in the absence of an explicit command by a user to save the electronic documents and in response to another user specified function associated with the electronic documents;

selecting one or more of the multiple saved electronic documents for publication over a network;

transforming the one or more of the selected electronic documents to meet predetermined format- and content-based standards for publication if the one or more selected electronic documents do not meet the standards for publication;

generating authorization information corresponding to the selected electronic documents;

transmitting to one or more recipients the authorization information corresponding to the selected electronic documents;

transmitting a document resource identifier, automatically and in association with publication, to one or more independent World Wide Web indexing services; and the server allowing access to a selected subset of the electronic documents by using the authorization information and the document resource identifier.

2. The method defined in claim 1 wherein the document resource identifier comprises a Universal Resource Locator (URL) that has been sent from a server.

3. The method defined in claim 1 further comprising preventing access to the electronic document once a condition exists.

4. The method defined in claim 3 wherein the condition is a predetermined amount of time has passed.

5. The method defined in claim 3 wherein the condition is the electronic document has been accessed a predetermined number of times.

6. The method of claim 1 wherein the transforming the one or more of the selected electronic documents to meet predetermined content-based standards for publication comprises removing confidential material from the one or more selected electronic documents if the one or more selected electronic documents contain confidential material.

7. The method of claim 1 wherein the transforming the one or more of the selected electronic documents to meet predetermined content-based standards for publication comprises removing one of a group consisting of violent and pornographic material from the one or more selected electronic documents if the one or more selected electronic documents contain such material.

8. The method of claim 1 wherein the transforming the one or more of the selected electronic documents to meet predetermined content-based standards for publication comprises removing confidential material from the one or more selected electronic documents if the one or more selected electronic documents contain confidential material.

9. The method of claim 1 wherein the authorization information comprises a user name and a password sent to an authorized user.

10. The method of claim 9 wherein the authorization information comprises a document identifier.

11. The method of claim 10 wherein the document identifier comprises a Uniform Resource Locator (URL).

12. An apparatus comprising:

means for receiving multiple electronic documents at a server that have been saved in the absence of an explicit command by a user to save the electronic documents and in response to another user specified function associated with the electronic documents;

means for selecting one or more of the multiple saved electronic documents for publication over a network;

means for transforming the one or more of the selected electronic documents to meet predetermined format- and content-based standards for publication if the one or more selected electronic documents do not meet the standards for publication;

means for generating authorization information corresponding to the selected electronic documents;

means for transmitting to one or more recipients the authorization information corresponding to the selected electronic documents;

means for transmitting a document resource identifier, automatically and in association with publication, to one or more independent World Wide Web indexing services; and means for allowing access to a selected subset of the electronic documents by using the authorization information and the document resource identifier.

13. The apparatus defined in claim 12 further comprising means for automatically notifying a user that an electronic-mail message containing a Universal Resource Locator (URL) has been sent from a server.

14. The method defined in claim 12 further comprising means for preventing access to the electronic document once a condition exists.

15. The method defined in claim 14 wherein the condition is a predetermined amount of time has passed.

16. The method defined in claim 14 wherein the condition is the electronic document has been accessed a predetermined number of times.

17. The apparatus defined in claim 12 further comprising means for generating a security key as part of the authorization information.

* * * * *